United States Patent
Wu

(10) Patent No.: US 8,545,989 B2
(45) Date of Patent: Oct. 1, 2013

(54) POLY(AMIC ACID AMIDEIMIDE) TERTIARY AMINE INTERMEDIATE TRANSFER MEMBERS

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 140 days.

(21) Appl. No.: 13/152,680

(22) Filed: Jun. 3, 2011

(65) Prior Publication Data

US 2012/0305857 A1 Dec. 6, 2012

(51) Int. Cl.
*B32B 27/28* (2006.01)
*C08K 5/17* (2006.01)

(52) U.S. Cl.
USPC ........ 428/473.5; 252/511; 399/302; 428/421; 428/422; 428/447; 524/145

(58) Field of Classification Search
USPC ................ 252/511; 399/302; 428/421, 422, 428/447, 473.5; 524/145
See application file for complete search history.

(56) References Cited

U.S. PATENT DOCUMENTS

| | | | |
|---|---|---|---|
| 5,487,707 A | 1/1996 | Sharf et al. | |
| 6,139,784 A | 10/2000 | Oshima et al. | |
| 6,318,223 B1 | 11/2001 | Yu et al. | |
| 6,440,515 B1 | 8/2002 | Thornton et al. | |
| 6,479,581 B1 * | 11/2002 | Ireland et al. | 524/600 |
| 6,489,020 B1 | 12/2002 | Caruthers, Jr. et al. | |
| 6,602,156 B2 | 8/2003 | Schlueter, Jr. | |
| 7,031,647 B2 | 4/2006 | Mischra et al. | |
| 7,130,569 B2 | 10/2006 | Goodman et al. | |
| 7,139,519 B2 | 11/2006 | Darcy, III et al. | |
| 7,920,813 B2 | 4/2011 | Inada et al. | |
| 7,923,084 B2 | 4/2011 | Kurachi et al. | |
| 2002/0054971 A1 * | 5/2002 | Shimojo et al. | 428/36.9 |
| 2006/0141273 A1 * | 6/2006 | Kino et al. | 428/473.5 |
| 2008/0020313 A1 * | 1/2008 | Wu et al. | 430/69 |
| 2008/0240802 A1 * | 10/2008 | Nakura | 399/313 |

FOREIGN PATENT DOCUMENTS

| | | | |
|---|---|---|---|
| JP | 10226028 A | * | 8/1998 |
| JP | 2005139351 A | * | 6/2005 |

OTHER PUBLICATIONS

Machine translation of JP 10226028 (2012).*
Machine translation of JP 2005139351 (2012).*
Derwent accession No. 1998-514549 for JP 10-226028, Kuraoka et al., Aug. 25, 1998.*

* cited by examiner

*Primary Examiner* — Callie Shosho
*Assistant Examiner* — John Freeman
(74) *Attorney, Agent, or Firm* — Eugene O. Palazzo

(57) ABSTRACT

An intermediate transfer member that includes a mixture of a poly(amic acid amideimide), a tertiary amine, an optional phosphate ester, an optional polysiloxane or an optional fluoro polymer, and an optional conductive filler component.

18 Claims, 1 Drawing Sheet

POLY(AMIC ACID AMIDEIMIDE) TERTIARY AMINE INTERMEDIATE TRANSFER MEMBERS

This disclosure is generally directed to an intermediate transfer member that includes a mixture of a poly(amic acid amideimide), an optional phosphate ester, a tertiary amine, an optional siloxane polymer and/or an optional fluoro polymer, and an optional conductive component.

BACKGROUND

Intermediate transfer members, such as intermediate transfer belts selected for transferring a developed image in xerographic systems, are known. For example, there are known intermediate transfer belts that contain polyphenylsulfones or thermosetting polyimides. The polyphenylsulfones have a tendency to degrade after a number of xerographic printing cycles, such as from about 20 to about 30 kiloprints, while polyimides can be costly, especially because such polyimides are usually subjected to curing by heating for extended time periods.

There are also known intermediate transfer members that include materials of a low unacceptable modulus or break strength, poor release characteristics from metal substrates, and which members have minimum or poor folding prevention characteristics resulting in the disruption of a full and high resolution transfer of xerographic images from a surface, like a photoconductor or to a document, such as paper. Also known are intermediate transfer members with characteristics that cause these members to become brittle, resulting in inadequate acceptance of the developed image from a photoconductor and subsequent partial transfer of developed xerographic images to a substrate like paper.

A further disadvantage relating to the preparation of an intermediate transfer member is that there is usually deposited a separate release layer on a metal substrate, and thereafter there is applied to the release layer the intermediate transfer member components, and where the release layer allows the components to be separated from the metal substrate by peeling or by the use of mechanical devices. Thereafter, the intermediate transfer member components are in the form of a film, which can be selected for xerographic imaging systems, or the film can be deposited on a supporting substrate like a polymer layer. The use of an intermediate release layer adds to the cost and time of preparation, and such a layer can modify a number of the intermediate transfer member characteristics.

For low end xerographic machines and printers that produce about 30 pages or less per minute, thermoplastic intermediate transfer members are usually used because of their low cost. However, the modulus values or break strengths of thermoplastic materials, such as certain polycarbonates, polyesters, and polyamides are relatively low of from about 1,000 to 2,000 Mega Pascals (MPa).

High end xerographic machines and printers that generate at least 30 pages per minute and up to 75 pages per minute usually select intermediate transfer members of thermoplastic polyimides, thermosetting polyimides, or polyamideimides primarily because of their acceptable modulus of about 3,500 Mega Pascals. However, intermediate transfer members using these materials are uneconomical in that both the raw material cost and the manufacturing process cost are higher than when using polyesters or polyamides. Thus, an economical intermediate transfer member possessing high modulus and excellent release characteristics for high end machines is desired.

Intermediate transfer members that enable acceptable registration of the final color toner image in xerographic color systems using synchronous development of one or more component colors, and using one or more transfer stations, are known. However, a disadvantage of using an intermediate transfer member, in color systems, is that a plurality of developed toner transfer operations is needed, thus sometimes causing charge exchange between the toner particles and the transfer member, which ultimately can result in less than complete toner transfer. This can result in low resolution images on the image receiving substrate like paper, and image deterioration.

When the image is in color, the image can additionally suffer from color shifting and color deterioration. Thus, when an image is formed on a sheet of paper in a color image-forming apparatus using an intermediate transfer member, four color images in yellow, magenta, cyan and black, respectively, are generally first transferred sequentially from an image carrier such as a photoreceptor and superimposed on the intermediate transfer member (the primary transfer). This full color image is then transferred to a sheet of paper in a single step (the secondary transfer). In a black and white image-forming apparatus, a black image is transferred from the photoreceptor, superimposed on an intermediate transfer member, and then transferred to a sheet of paper.

There is a need for intermediate transfer members that substantially avoid or minimize the disadvantages of a number of known intermediate transfer members.

There is a need for seamless intermediate transfer members that are substantially free of breaking when being folded and applying a pressure force of for example, about 1 kilogram (kg) on the folding line.

Further, there is a need for intermediate transfer member materials with minimal brittleness, and excellent break strengths, rendering such members as being readily releasable, or self releasable, from substrates.

There is also a need for intermediate transfer members that can be economically and efficiently prepared and that possess rapid release characteristics from a number of substrates that are selected when such members are prepared.

Another need relates to intermediate transfer members that have excellent conductivity or resistivity, and that possess acceptable humidity insensitivity characteristics permitting developed images with minimal resolution issues.

Moreover, there is a need for intermediate transfer members with acceptable wear characteristics, and with excellent break strengths as determined by known modulus measurements.

These and other needs are achievable in embodiments with the intermediate transfer members, and components thereof disclosed herein.

SUMMARY

Disclosed is an intermediate transfer member comprising a poly(amic acid amideimide) and a tertiary amine.

Also, disclosed is a seamless intermediate transfer member comprising a mixture of a poly(amic acid-co-amideimide) copolymer, a phosphate ester, a polydialkylsiloxane copolymer, a tertiary amine of an alkylimidazole, or a trialkylamine, and a conductive filler component, and wherein the poly(amic acid-co-amideimide) copolymer is encompassed by the following formulas/structures where m and n independently represent the number of repeating segments, where m is a number of from about 100 to about 1,000, and n is a number of from about 100 to about 1,000

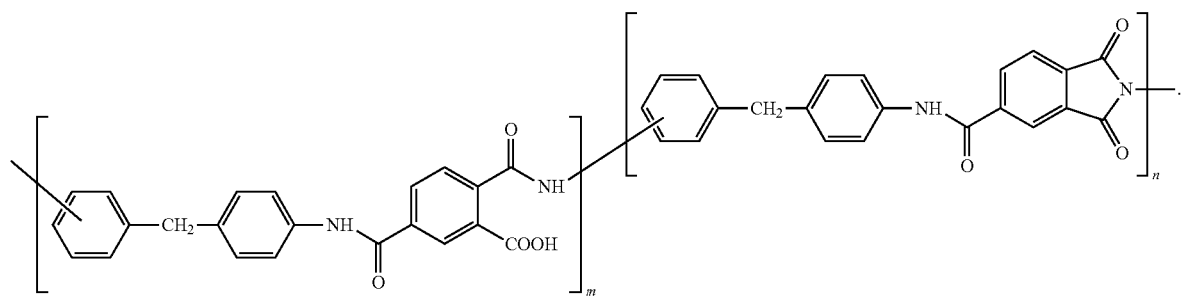

In embodiments there is illustrated herein an intermediate transfer member comprising a mixture of a poly(amic acid-co-amideimide) copolymer, a tertiary amine, a phosphate ester, a polydialkylsiloxane, and a conductive carbon black component, which member possesses a break strength of from about 130 to about 170 Mega Pascals.

FIGURES

The following Figures are provided to further illustrate the intermediate transfer members disclosed herein.

EMBODIMENTS

There is provided herein an intermediate transfer member comprising an optional supporting substrate, and thereover a layer comprising a mixture of a poly(amic acid amideimide) polymer, an optional conductive component or filler like carbon black, an optional phosphate ester, a tertiary amine, and an optional siloxane or fluoro polymer.

Figure 1:
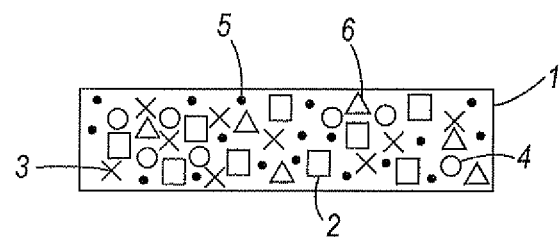
FIG. 1 illustrates an exemplary embodiment of a one-layer intermediate transfer member of the present disclosure.

In FIG. 1 there is illustrated a one-layer intermediate transfer member comprising a layer 1, comprising poly(amic acid amideimides) 2, optional conductive components or fillers 3, tertiary amines 4, optional phosphate esters 5, and optional siloxane polymers or optional fluoro polymers 6.

Figure 2:
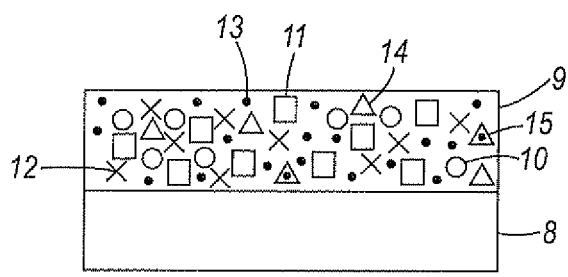
FIG. 2 illustrates an exemplary embodiment of a two-layer intermediate transfer member of the present disclosure.

In FIG. 2 there is illustrated a two-layer intermediate transfer member comprising a supporting substrate 8, a layer 9, comprising a mixture of poly(amic acid amideimides) 10, optional fillers 11, tertiary amines 12, optional phosphate esters 13, and optional siloxane polymers 14, or optional fluoro polymers 15.

Figure 3:
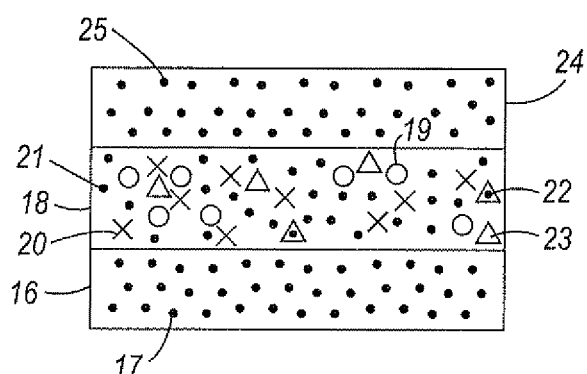
FIG. 3 illustrates an exemplary embodiment of a three-layer intermediate transfer member of the present disclosure.

In FIG. 3 there is illustrated a three-layer intermediate transfer member comprising a supporting substrate 16, comprising fillers 17, dispersed therein, and thereover a layer 18, comprising a mixture of poly(amic acid amideimides) 19, optional conductive fillers 20, tertiary amines 21, optional phosphate esters 22, and optional siloxane polymers 23, and thereover an optional release layer 24, comprising release components 25.

There is disclosed an intermediate transfer member that generally comprises a mixture of a tertiary amine and a poly (amic acid amideimide), or comprises a blend or mixture of a poly(amic acid amideimide) polymer, such as a poly(amic acid-co-amideimide) copolymer, a conductive compound like carbon black, a tertiary amine, a phosphate ester, and a suitable polymer such as a polysiloxane, a fluoro polymer, or mixtures thereof. The resulting intermediate transfer members exhibit improved properties compared to a number of conventional intermediate transfer members formed using polyimides, but at substantially reduced costs, such as about $32 per pound for the poly(amic acid amideimide) polymer compared to about $200 per pound for known polyimides; and with excellent release characteristics, smooth high quality surfaces, and improved mechanical properties that enable the folding of the intermediate transfer members with substantially no undesirable breaking.

The intermediate transfer members comprising the poly (amic acid amideimide) polymer mixture disclosed herein exhibit excellent mechanical strengths of, for example, from about 1,000 to about 2,000 xerographic imaging kilocycles, while permitting the rapid and complete transfer, from about 90 to about 98 percent, or from about 95 to about 100 percent transfer, of the xerographic developed image, and a break strength of from about 100 to about 200 Mega Pascals (MPa), from about 125 to about 150 Mega Pascals, from about 130 to about 145 Mega Pascals, from about 120 to about 160 Mega Pascals, from about 135 to about 155 Mega Pascals, from about 130 to about 170 Mega Pascals, or from about 140 to about 143 Mega Pascals.

Also, the disclosed intermediate transfer members have a Young's modulus of, for example, from about 4,000 to about 5,500, from about 3,500 to about 6,000 Mega Pascals, from about 3,500 to about 5,500 Mega Pascals, from about 5,000 to about 5,500 Mega Pascals, or from about 4,000 to about 5,000 Mega Pascals; a glass transition temperature ($T_g$) of from about 200 to about 400° C. or from about 250 to about 375° C.; a CTE (coefficient of thermal expansion) of from about 20 to about 70 ppm/° K, or from about 35 to about 60 ppm/° K; and an excellent resistivity as measured with a known High Resistivity Meter of, for example, from about $10^8$ to about $10^{13}$ ohm/square, from about $10^9$ to about $10^{12}$ ohm/square, or from about $10^{10}$ to about $10^{11}$ ohm/square.

The intermediate transfer members of the present disclosure can be provided in any of a variety of configurations, such as a one-layer configuration, or in a multi-layer configuration including, for example, a supporting substrate and/or a release layer. The final intermediate transfer member may be in the form of an endless flexible belt, a web, a flexible drum or roller, a rigid roller or cylinder, a sheet, a drelt (a cross between a drum and a belt), seamless belt, and the like.

Poly(amic acid amideimide) Polymers

Various suitable poly(amic acid amideimide) polymers can be selected for the intermediate transfer members disclosed herein, inclusive of poly(amic acid amideimide) copolymers, mixtures of two or more different poly(amic acid amideimide) polymers, and the like.

Examples of poly(amic acid amideimide) polymers available from Solvay Chemical Company and selected for the disclosed intermediate transfer members are represented by the following formulas/structures

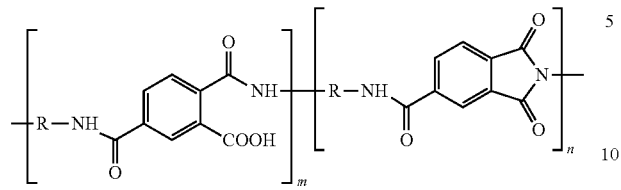

where m and n independently represent the respective number of repeating segments in the polymer chain. Examples of m and n repeating segment values are from about 20 to about 1,000, from about 75 to about 900, from about 275 to about 500, from about 100 to about 1,000, from about 100 to about 700, from about 150 to about 500, from about 325 to about 675, from about 200 to about 400, from about 200 to about 600, from about 275 to about 500, from about 100 to about 1,000, or fractions thereof, and where m and n can be of dissimilar values from each other; and wherein each R is independently an aryl or substituted aryl containing, for example, from about 6 to about 36 carbon atoms, from about 6 to about 24 carbon atoms, from about 6 to about 18 carbon atoms, from about 12 to about 24 carbon atoms, or from about 6 to about 12 carbon atoms.

Aryl examples for the poly(amic acid amideimide) polymers are phenyl, naphthyl, anthryl, and those aryls as represented by at least one of the following formulas/structures

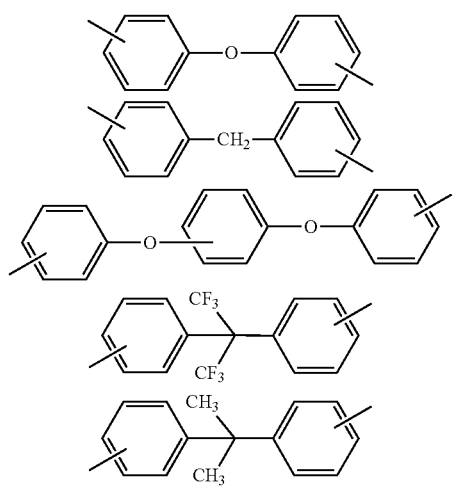

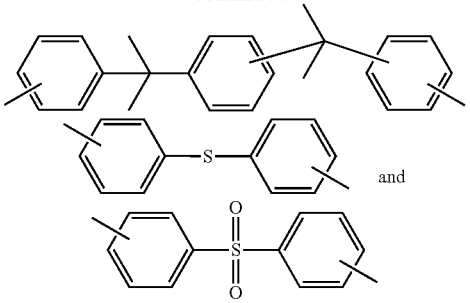

Specific examples of poly(amic acid amideimide) polymers include poly(amic acid-co-amideimide) copolymers as represented by the following formulas/structures where m and n independently represent the respective number of repeating segments in the polymer chain such as from about 20 to about 1,000, from about 100 to about 1,000, from about 75 to about 900, from about 100 to about 700, from about 200 to about 600, from about 200 to about 400, or from about 275 to about 500, or fractions thereof, and where m and n can be dissimilar values from each other

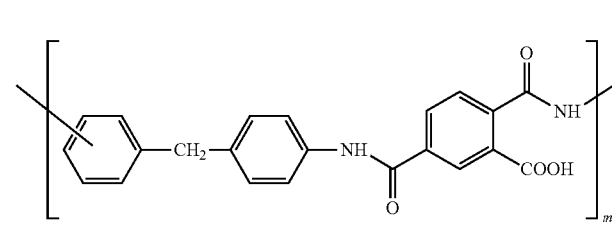

The poly(amic acid amideimide) polymers, such as the poly(amic acid-co-amideimide) copolymers available from Solvay Chemical Company, are believed in embodiments to be comprised of a reactive poly(amic acid-co-amideimide) copolymer comprised of a trimellitic, aromatic amide, and aromatic imide moieties. For the poly(amic acid-co-amideimide) copolymers, available as TORLON® AI-10LM from Solvay Chemical Company, approximately 50 percent of the copolymer is in the un-imidized or auric acid form, and then when heated to for example, from about 90 to about 350° C., or from about 125 to about 275° C., the copolymer undergoes cyclization in the presence of a catalyst, such as the tertiary amines illustrated herein, to the imide form.

Without desiring to be limited by theory, advertising brochures, and other sources, three processes are believed to occur during curing or heating in forming the poly(amic acid amideimide) polymers: removal of the solvent, imidization, and chain extension or weight average molecular weight increase. For example, by heating the poly(amic acid amideimide) polymer at from about 93° C. to about 150° C., an imidization reaction occurs through cyclization of the ortho carboxylic acid with the amide to form the five-membered imide ring with the evolution of water. Continued heating at from about 150° C. to about 232° C. removes most, such as from about 95 to about 99 percent, of the solvent with some chain extension occurring. Also, peak temperatures of from about 249° C. to about 320° C. can be selected to remove any final traces of solvent and to permit selected molecular weights and excellent intermediate transfer member properties. It is also believed that with the addition of a tertiary amine catalyst as disclosed herein the three curing processes can be accelerated by from about 20 to about 50 percent and advanced towards more complete stages, about 100 percent imidization, thereby resulting in excellent robust mechanical characteristics and where the members can be folded a number of times, up to for example 100, without breaking and adversely affecting the members' reuse in xerographic processes.

Specific commercially available examples of the poly (amic acid amideimide) polymers include TORLON® AI-10, AI-10LM, 4000T-LV, 4000T-MV, 4000T-HV or 4000TF, and the like, all available from Solvay Chemical Company.

The number average molecular weight of the poly(amic acid amideimide) polymers selected for the disclosed intermediate transfer members in embodiments can be, for example, from about 2,000 to about 100,000, from about 5,000 to about 80,000, from about 10,000 to about 50,000, or from about 2,000 to about 100,000, and where the weight average molecular weight can be, for example, from about 4,000 to about 200,000, from about 10,000 to about 160,000, from about 20,000 to about 100,000 or from about 4,000 to about 20,000. The number average and weight molecular weights are determined by known methods, such as Gel Permeation Chromatography analysis (GPC).

The poly(amic acid amideimide) polymers as illustrated herein can be included in the intermediate transfer member mixture in various effective suitable amounts, such as in an amount of from about 60 to about 97 weight percent, from about 70 to about 95 weight percent, from about 75 to about 95 weight percent, or from about 83 to about 90 weight percent, based on the total of the components or ingredients in the mixture.

Tertiary Amines

The tertiary amines, which can also function as a catalyst to complete the imization of the poly(amic acid amideimide) to assist in permitting intermediate transfer member robust mechanical properties as disclosed herein, include alkylimidazoles, trialkylamines, or mixtures thereof, where alkyl contains from 1 to about 18 carbon atoms, from 1 to about 12 carbon atoms, from 1 to about 6 carbon atoms, or from 1 to about 3 carbon atoms. Specific examples of alkyls are methyl, ethyl, propyl, butyl, pentyl, hexyl, heptyl, nonyl, decyl, and the like.

Examples of specific tertiary amines selected for the intermediate transfer member mixtures include 1-methylimidazole, 1-ethylimidazole, 1-propylimidazole, trimethylamine, triethylamine, tripropylamine, tributylamine, and the like, and mixtures thereof.

The tertiary amines can be present in the disclosed intermediate transfer member mixture in various effective amounts, such as from about 0.1 to about 5 weight percent, from about 0.1 to about 4 weight percent, from about 0.1 to about 3 weight percent, from about 0.5 to about 1 weight percent, from about 0.1 to about 2 weight percent, and from about 0.1 to about 0.3 weight percent based on the total of the mixture ingredients.

Optional Phosphate Esters

The intermediate transfer members of the present disclosure can also include an optional phosphate ester that is blended or mixed with the poly(amic acid amideimide) polymer, and the other components illustrated herein, such as a polysiloxane, the tertiary amine, and the conductive filler. As the phosphate esters, which can also function to assist in release of the poly(amic acid amideimide)polymer containing mixture from a substrate like stainless steel, any suitable phosphate ester, or mixture of two, three, or more different phosphate esters can be used.

Examples of suitable phosphate esters that can be mixed with the poly(amic acid amideimide) containing mixtures include a number of known phosphate esters, and more specifically, where the phosphate ester is a phosphate ester of alkyl alcohol alkoxylate such as alkyl alcohol ethoxylate, alkyl phenol alkoxylate such as alkyl phenol ethoxylate, alkyl polyalkoxyethanol such as alkyl polyethoxyethanol, alkylphenoxy polyalkoxyethanol such as alkylphenoxy polyethoxyethanol, mixtures thereof, and the corresponding alkoxy esters wherein alkyl and alkoxy contain, for example, from 1 to about 36 carbon atoms, from 1 to about 18 carbon atoms, from 1 to about 12 carbon atoms, or from 1 to about 6 carbon atoms, optionally mixtures thereof, and the like. Various suitable phosphate esters are available from STEPAN Company, Northfield, Ill. In embodiments, it has been reported that the number average molecular weight of the phosphate ester is, for example, from about 200 to about 2,000, from about 500 to about 1,000, or from about 300 to about 800, and the weight average molecular weight of the phosphate ester is, for example, from about 250 to about 8,000, from about 1,000 to about 5,000, or from about 400 to about 2,000.

Phosphate esters of alkyl alcohol ethoxylate examples that can be selected for adding to or mixing with the poly(amic acid amideimide) mixtures include POLYSTEP® P-11, P-12 and P-13 (tridecyl alcohol ethoxylate phosphate, available from STEPAN Company, Northfield, Ill.) with an average mole number of ethoxy (EO) groups of about 3, 6 and 12, respectively, where the average mole number of ethoxy groups can be determined by known methods, such as NMR. With a single phosphate ester like POLYSTEP® P-11 that has three ethoxy (EO) groups [—$CH_2CH_2O$—$CH_2CH_2O$—$CH_2CH_2O$—] in its structure, the higher the mole number of EO, the higher the molecular weight of the phosphate ester. Specific examples of the aforementioned phosphate esters present in the amounts illustrated herein are an alkyl alcohol ethoxylates, with from 1 to about 25 carbon atoms, like trioctyl alcohol ethoxylate phosphate, trihexyl alcohol ethoxylate phosphate, triheptyl alcohol ethoxylate phosphate, or tripentyl alcohol ethoxylate phosphate.

Examples of phosphate esters of alkyl phenol ethoxylates that can be blended with the poly(amic acid amideimide) mixtures illustrated herein include POLYSTEP® P-31, P-32, P-33, P-34 and P-35 (nonylphenol ethoxylate phosphate, available from STEPAN Company, Northfield, Ill.) with an average mole number of ethoxy (EO) groups of about 4, 6, 8, 10 and 12, respectively. Other examples of phosphate esters of alkyl phenol ethoxylates include octylphenol ethoxylate phosphate, hexylphenol ethoxylate phosphate, decylphenol ethoxylate phosphate, or heptylphenol ethoxylate phosphate.

Phosphate esters of alkyl polyethoxyethanol that can be blended with the poly(amic acid amideimide) mixture include STEPFAC™ 8180, 8181 and 8182 (polyethylene glycol tridecyl ether phosphate, available from STEPAN Company, Northfield, Ill.) with an average mole number of ethoxy (EO) groups of about 3, 6 and 12, respectively. Other examples of phosphate esters of alkyl polyethoxyethanol include polyethylene glycol trioctyl ether phosphate, polyethylene glycol triheptyl ether phosphate, polyethylene glycol trihexyl ether phosphate, or polyethylene glycol tripentyl ether phosphate.

Alkylphenoxy polyethoxyethanol phosphate esters that can be included together with the poly(amic acid amideimide) containing mixtures include STEPFAC™ 8170, 8171, 8172, 8173, 8175 (nonylphenol ethoxylate phosphate, available from STEPAN Company, Northfield, Ill.) with an average mole number of ethoxy (EO) groups of about 10, 6, 4, 8 and 12, respectively. Phosphate esters of alkylphenoxy polyethoxyethanol include octylphenol ethoxylate phosphate, decylphenol ethoxylate phosphate, heptylphenol ethoxylate phosphate, or hexylphenol ethoxylate phosphate.

Various amounts of phosphate esters can be selected for the intermediate transfer members disclosed herein, such as for example, from about 0.1 to about 10 weight percent, from about 0.5 to about 10 weight percent, from about 0.5 to about 5 weight percent, from about 1 to about 3 weight percent, from about 0.2 to about 3 weight percent, from about 0.5 to about 5 weight percent, from about 0.1 to about 5 weight percent, or from about 2 to about 4 weight percent, based on the total of the mixture ingredients.

Optional Polysiloxane Polymers

Examples of polysiloxane polymers that can be added to the poly(amic acid amideimide) and the tertiary amine mixture, or to the mixture of the poly(amic acid amideimide), the tertiary amine, the conductive component, and the phosphate ester are polyether modified polydimethylsifoxanes, commercially available from BYK Chemical Chemical as BYK® 333, BYK® 330 (about 51 weight percent in methoxypropylacetate); BYK® 344 (about 52.3 weight percent in xylene/isobutanol=80/20); BYK®-SILCLEAN 3710 and BYK®-SILCLEAN 3710 3720 (about 25 weight percent in methoxypropanol); a copolymer of a polyester and a polydimethylsiloxane, commercially available from BYK Chemical as BYK® 310 (about 25 weight percent in xylene) and BYK® 370 (about 25 weight percent in xylene/alkylbenzenes/cyclohexanone/monophenylglycol=75/11/7/7); a copolymer of a polyacrylate and a polydimethylsiloxane, commercially available from BYK Chemical as BYK®-SILCLEAN 3700 (about 25 weight percent in methoxypropylacetate); and a copolymer of a polyester polyether modified polydimethylsiloxane, commercially available from BYK Chemical as BYK® 375 (about 25 weight percent in dipropylene glycol monomethyl ether).

The polysiloxane polymer, or copolymers thereof can be present in various effective amounts, such as from about 0.01 to about 1 weight percent, from about 0.05 to about 1 weight percent, from about 0.05 to about 0.5 weight percent, and from about 0.1 to about 0.3 weight percent based on the total of the mixture ingredients.

Optional Fluoro Polymers

Examples of fluoro polymers and fluoro copolymers that can be mixed with the poly(amic acid amideimide) and the tertiary amine; or the poly(amic acid amideimide), the conductive component, the phosphate ester, and the tertiary amine, are Novec™ FC-4432 available from 3M, TEFLON® like materials including fluorinated ethylene propylene copolymers (FEP), polytetrafluoroethylene (PTFE), polyfluoroalkoxy polytetrafluoroethylenes (PFA TEFLON®), and other TEFLON® like materials, and those fluoro polymers disclosed herein and selected for the release layer.

The fluoro polymer, or copolymers thereof can be present in various effective amounts, such as from about 0.01 to about 1 weight percent, from about 0.05 to about 1 weight percent, from about 0.05 to about 0.5 weight percent, and from about 0.1 to about 0.3 weight percent based on the total of the mixture ingredients.

Mixtures of the polysiloxane and the fluoro polymers illustrated herein can be selected for the intermediate transfer member where the mixtures can include various effective amounts of each of the two polymers. For example, the polysiloxane can be present in an amount of from about 1 to about 99 weight percent, from about 10 to about 90 weight percent, or from about 25 to about 50 weight percent, and the fluoro polymer can be present in an amount of from about 99 to about 1 weight percent, from about 90 to about 10 weight percent, from about 50 to about 75 weight percent, from about 25 to about 50 weight percent and where the total of the polysiloxane and the fluoro polymer is about 100 percent.

Optional Fillers

Optionally, the intermediate transfer member may contain one or more fillers in the supporting substrate, when present, and in the poly(amic acid amideimide) mixtures. For example, conductive fillers can be included to alter and adjust the conductivity of the disclosed intermediate transfer members. Where the intermediate transfer member is a one layer structure, the conductive filler can be included in the poly(amic acid amideimide) mixture. However, where the intermediate transfer member is a multi-layer structure, the conductive filler can be included in one or more layers of the member, such as in the supporting substrate and/or the poly(amic acid amideimide) containing mixture layer coated thereon.

Any suitable filler can be used that provides the desired results. For example, suitable fillers include carbon blacks, metal oxides, polyanilines, other known suitable fillers, and mixtures of fillers. When present, the filler can be included in the mixtures illustrated herein in an amount of from about 1 to about 60 weight percent, from about 1 to about 30 weight percent, from about 3 to about 40 weight percent, from about 10 to about 30 percent, from about 4 to about 30 weight percent, or from about 5 to about 20 weight percent of the total weight of the components in the layer in which the filler is included.

Examples of carbon black fillers that can be selected for the intermediate transfer member mixtures, and where the particle sizes can be determined by an electron microscope and the B. E. T. surface areas can be determined by the standard known one point nitrogen gas physisorption method, include special black 4 (B.E.T. surface area=180 m$^2$/g, DBP absorption=1.8 ml/g, primary particle diameter=25 nanometers), available from Evonik-Degussa; special black 5 (B.E.T. surface area=240 m$^2$/g, DBP absorption=1.41 ml/g, primary particle diameter=20 nanometers), color black FW1 (B.E.T. surface area=320 m$^2$/g, DBP absorption=2.89 ml/g, primary particle diameter=13 nanometers), color black FW2 (B.E.T. surface area=460 m$^2$/g, DBP absorption=4.82 ml/g, primary particle diameter=13 nanometers), and color black FW200 (B.E.T. surface area=460 m$^2$/g, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m²/g, DBP absorption=0.71 ml/g), MONARCH® 880 (B.E.T. surface area=220 m²/g, DBP absorption=1.05 ml/g, primary particle diameter=16 nanometers), and MONARCH® 1000 (B.E.T. surface area=343 m²/g, DBP absorption=1.05 ml/g, primary particle diameter=16 nanometers); and Channel carbon blacks available from Evonik-Degussa. Other known suitable carbon blacks not specifically disclosed herein may be selected as the filler or conductive component for the intermediate transfer member disclosed herein.

Examples of polyaniline fillers that can be selected for incorporation into the poly(amic acid amideimide) mixtures are PANIPOL™ F, commercially available from Panipol Oy, Finland, and known lignosulfonic acid grafted polyanilines. These polyanilines usually have a relatively small particle size diameter of, for example, from about 0.5 to about 5 microns; from about 1.1 to about 2.3 microns, or from about 1.5 to about 1.9 microns.

Metal oxide fillers that can be selected for the disclosed intermediate transfer member poly(amic acid amideimide) mixture include, for example, tin oxide, antimony doped tin oxide, indium oxide, indium tin oxide, zinc oxide, titanium oxide, and the like.

Optional Polymers

In embodiments of the present disclosure, the intermediate transfer member can further include an additional polymer in the poly(amic acid amideimide) mixture that also contains a phosphate ester, the tertiary amine, the polysiloxane polymer, and the optional conductive filler components.

Examples of suitable additional polymers include a polyimide, polyamideimide, a polycarbonate, a polyphenylene sulfide, a polyimide, a polysulfone, a polyetherimide, a polyester, a polyvinylidene fluoride, a polyethylene-co-polytetrafluoroethylene, poly(amic acid amideimide) polymer, and the like, and mixtures thereof.

When an additional polymer is selected, it can be included in the poly(amic acid amideimide) mixture in any desirable and effective amounts, such as in an amount of from about 1 to about 75 weight percent, from about 2 to about 45 weight percent, or from about 3 to about 15 weight percent, based on a total weight of the polymer layer.

Supporting Substrates

When desired, a supporting substrate, in the configuration of a layer, can be included in the disclosed intermediate transfer members, such as below the poly(amic acid amideimide) mixture containing layer. The supporting substrate can provide increased rigidity or strength to the intermediate transfer member. When a supporting substrate is used, a metal or glass substrate used in forming the intermediate member can be replaced by the supporting substrate material, or the supporting substrate can first be formed on the metal or glass substrate followed by forming the poly(amic acid amideimide) containing mixture on the supporting substrate, and prior to removing the completed structure from the metal or glass substrate.

The poly(amic acid amideimide) containing mixture can be coated on any suitable supporting substrate material to form a dual layer intermediate transfer member. Exemplary supporting substrate materials include polyimides, polyamideimides, polyetherimides, and the like, and mixtures thereof.

More specifically, examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, thermosetting polyimides and the like. The thermosetting polyimides can be cured at temperatures of from about 180 to about 260° C. over a short period of time, such as from about 10 to about 120 minutes, or from about 20 to about 60 minutes, and generally have a reported number average molecular weight of from about 5,000 to about 500,000, or from about 10,000 to about 100,000, and a weight average molecular weight of from about 50,000 to about 5,000,000, or from about 100,000 to about 1,000,000.

Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates for the intermediate transfer members disclosed herein are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15 [weight percent], $T_g$=255° C., and $M_w$=8,000), HR-13NX (30 weight percent solution in N-methylpyrrolidone/xylene=67/33 [weight percent], $T_g$=280° C., and $M_w$=10,000), HR-15ET (25 weight percent solution in ethanol/toluene=50/50 [weight percent], $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga., where $M_w$ represents the weight average molecular weight.

Examples of specific polyetherimide supporting substrates that can be selected for the intermediate transfer members disclosed herein are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Once formed, the supporting substrate can have any desired and suitable thickness. For example, the supporting substrate can have a thickness of from about 10 to about 300 microns, from about 50 to about 150 microns, and from about 75 to about 125 microns.

Optional Release Layer

In embodiments, the disclosed intermediate transfer members may further include an outer release layer, usually present on the mixture of the poly(amic acid amideimide), the tertiary amine, the phosphate ester, the polysiloxane or fluoropolymer, and the filler. The release layer can be included, for example, to alter the surface characteristics of the disclosed intermediate transfer members to allow easier release of toner material from the merribers.

Exemplary materials or components that are suitable for use in a release layer include TEFLON® like materials including fluorinated ethylene propylene copolymer (FEP), polytetrafluoroethylene (PTFE), polyfluoroalkoxy polytetrafluoroethylene (PFA TEFLON®), and other TEFLON® like materials; silicone materials, such as fluorosilicones and silicone rubbers, such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomers can be those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomers. Also, the phosphate esters disclosed herein can assist in release.

The release layer may be deposited on the poly(amic acid amideimide) or the poly(amic acid amideimide) containing mixture by any known coating processes. Known methods for forming the outer release layer include dipping, spraying, such as by multiple spray applications of very thin films, casting, flow-coating, web-coating, roll-coating, extrusion, molding, or the like.

Intermediate Transfer Member Formation

The poly(amic acid amideimide) containing mixtures illustrated herein can be formulated into an intermediate transfer member by any suitable method. For example, with known milling processes, there can be prepared uniform dispersions of the intermediate transfer member mixture that is then coated on individual metal substrates, such as a stainless steel substrate or the like, using known draw bar coating methods. The resulting individual film or films can be dried at high temperatures, such as by heating at from about 100 to about 400° C., at from about 125° C. to 190° C., at from about 300° C. to about 320° C., at from about 160 to about 300° C., or other temperatures disclosed herein, for a suitable period of time, such as from about 20 to about 180 minutes, from about 40 to about 120 minutes, or from about 30 to about 60 minutes, while remaining on the substrates. After drying and cooling to room temperature, about 23 to about 25° C., the films resulting can be removed from the substrates by known processes, such as by hand peeling or such films can be self-releasing with no outside assistance. The resultant films can have a thickness of, for example, from about 15 to about 150 microns, from about 20 to about 100 microns, or from about 25 to about 80 microns.

As metal substrates selected for the deposition of the poly (amic acid amideimide) containing mixture, there can be selected stainless steel, aluminum, nickel, copper, and their alloys, or other conventional materials. Other suitable substrates that can be used include glass plates, and the like.

Examples of solvents selected for formation of the poly (amic acid amideimide) containing mixtures, which solvents can be selected in an amount of from about 60 to about 95 weight percent, or from about 70 to about 90 weight percent of the total coating mixture ingredients include alkylene halides, such as methylene chloride, tetrahydrofuran, toluene, monochlorobenzene, N-methyl-2-pyrrolidone, N,N-dimethylformamide, N,N-dimethylacetamide, methyl ethyl ketone, dimethylsulfoxide (DMSO), methyl isobutyl ketone, formamide, acetone, ethyl acetate, cyclohexanone, acetanilide, mixtures thereof, and the like. Diluents can be mixed with the solvents of the poly(amic acid amideimide) copolymer solutions. Examples of diluents added to the solvents in amounts, for example, of from about 1 to about 25 weight percent, or from 1 to about 10 weight percent based on the weight of the solvent and the diluent are known diluents like aromatic hydrocarbons, ethyl acetate, acetone, cyclohexanone, and acetanilide.

The disclosed intermediate transfer members are, in embodiments, seamless, that is, with an absence of any seams or visible joints in the members. Moreover, the intermediate transfer members disclosed herein may be weldable. That is, opposite ends of the formed film can be welded together, such as by ultrasonic welding, to produce a seam.

The intermediate transfer members illustrated herein can be selected for a number of printing and copying systems, inclusive of xerographic printing systems. For example, the disclosed intermediate transfer members can be incorporated into a multi-imaging xerographic machine where each developed toner image to be transferred is formed on the imaging or photoconductive drum at an image forming station, and where each of these images is then developed at a developing station, and transferred to the intermediate transfer member. The images may be formed on a photoconductor and developed sequentially, and then transferred to the intermediate transfer member. In an alternative method, each image may be formed on the photoconductor or photoreceptor drum, developed, and then transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

Specific embodiments will now be described in detail. These examples are intended to be illustrative, and are not limited to the materials, conditions, or process parameters set forth in these embodiments. All parts are percentages by weight of total solids unless otherwise indicated. The viscosity values were determined with a viscometer.

COMPARATIVE EXAMPLE 1

A coating composition was prepared by stirring a mixture of special carbon black 4 obtained from Degussa Chemicals, a polyimide of a polyamic acid of pyromellitic dianhydride/4,4'-oxydianiline available as PYRE-M.L.® RC-5019 from Industrial Summit Technology, and a copolymer of a polyester and a polydimethylsiloxane, available as BYK® 310 from BYK Chemical, in a ratio of 14/85.95/0.05 based on the initial mixture feed amounts, in N-methyl-2-pyrrolidone (NMP), about 13 weight solids. The obtained intermediate transfer member dispersion was then coated on a stainless steel substrate of a thickness of 0.5 millimeter, and subsequently the mixture was cured by a sequential heating at 125° C. for 30 minutes, 190° C. for 30 minutes, and 320° C. for 60 minutes. The resulting intermediate transfer member comprised of the above components in the ratios indicated did not readily release from the stainless substrate, but rather adhered to the substrate. After being immersed in water for 3 months, the intermediate transfer member film obtained eventually released from the substrate.

COMPARATIVE EXAMPLE 2

Coating composition mixtures comprising the poly(amic acid-co-amideimide) copolymer, TORLON® AI-10LM, where m is of a value of 300, n is of a value of 300, and R is $C_6H_4$—$CH_2$—$C_6H_4$ in the following general formulas/structures, and special carbon black 4 (B.E.T. surface area=180 m$^2$/g, DBP absorption=1.8 ml/g, primary particle diameter=25 nanometers), as obtained from DeGussa Chemicals, with a weight ratio of 83/17 in N-methylpyrrolidone (about 30 weight percent solids) were prepared with an Attritor.

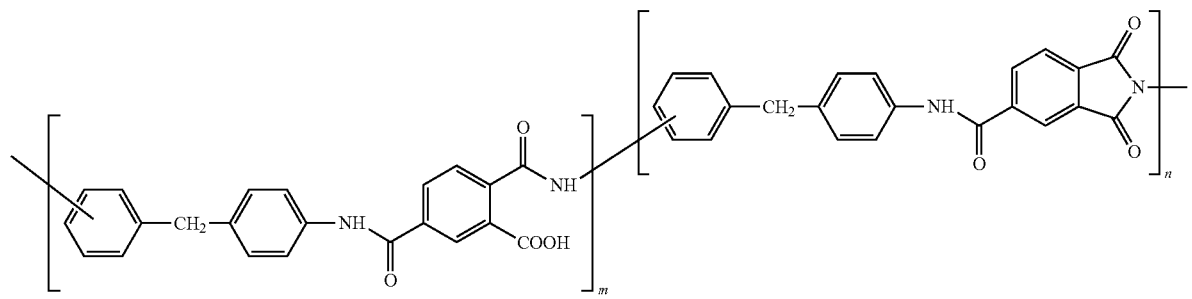

Subsequently, about 0.2 weight percent of the polysiloxane copolymer, BYK® 333, obtained from BYK Chemical Company, and the phosphate ester, STEPFAC® 8171 (nonylphenol ethoxylate phosphate, available from STEPAN Company, Northfield, Ill., with an average mole number of ethoxy (ED) of about 6), about 2 weight percent, was added to the Attritor containing the above prepared coating composition.

The resulting dispersion, about 30 weight percent solids and with an about 1,300 cps viscosity, was coated on a stainless steel substrate of a thickness of 0.5 millimeter, followed by drying at 150° C. for 30 minutes, 200° C. for 30 minutes, 250° C. for 30 minutes, and 290° C. to 30 minutes. There resulted after the obtained dried coating self released and without any outside assistance from the stainless steel substrates, two seamless 100 micron thick intermediate transfer members as determined by visual observation and by use of a microscope, and where the weight ratio of the poly(amic acid-co-amideimide)/carbon black/polysiloxane/phosphate ester was 81.21 16.6/0.2/2, based on the above initial mixture feed amounts.

EXAMPLE I

An intermediate transfer member was prepared by repeating the process of Comparative Example 2 except here was added to the coating mixture 0.5 weight percent of 1-methylimidazole. The resulting dispersion (about 30 weight percent solids and about 1,300 cps in viscosity) was coated on the stainless steel substrate, dried at 150° C./30 minutes, 200° C./30 minutes, 250° C./30 minutes, and 290° C./30 minutes. The weight ratio of the poly(amic acid-co-amideimide)/carbon black/polysiloxane/phosphate ester/1-methylimidazole was 80.8/16.5/0.2/2/0.5, based on the above initial mixture feed amounts.

There resulted after the obtained dried coating self released from the stainless steel substrate, and without any outside assistance, a seamless 100 micron thick intermediate transfer member as determined by visual observation and by use of a microscope.

EXAMPLE II

The process of Example I is repeated except that there is selected in place of the 1-methylimidazole, 1-ethylimidazole, triethylamine or trimethylamine and substantially similar self releasing results were obtained.

Measurements

The above intermediate transfer members (ITM) of Comparative Example 1, Comparative Example 2, and Example I, were measured for Young's modulus, break strength, and resistivity. The measurement results are provided in the following Table 1.

The Young's modulus and break strength were measured by following the known ASTM D882-97 process where samples (0.5 inch×12 inch) of each intermediate transfer member were placed in the Instron Tensile Tester measurement apparatus, and then the samples were elongated at a constant pull rate until breaking. During this time, there was recorded the resulting load versus the sample elongation. The Young's Modulus was calculated by taking any point tangential to the initial linear portion of the recorded curve results and dividing the tensile stress by the corresponding strain. The tensile stress was calculated by the load divided by the average cross sectional area of each of the test samples. The break strength was recorded as the tensile stress when the sample broke or came apart. The results are provided in Table 1.

The surface resistivity of the above intermediate transfer members of Comparative Example 1, Comparative Example 2, and Example I, were measured using a High Resistivity Meter, and the results are provided in Table 1.

The above intermediate transfer members of Comparative Example 1, Comparative Example 2, and Example I, were also tested by being folded and applying a pressure force of about 1 kg to test whether the member broke or not, and the results are also provided in Table 1

TABLE 1

| Intermediate Transfer Member | Young's Modulus (MPa) | Break Strength (MPa) | Resistivity (ohm/sq) | Tendency To Break When Folded |
|---|---|---|---|---|
| Comparative Example 1 | 6,000 | 163 | $10^{10}$ | No Breakage |
| Comparative Example 2 | 4,000 | 91 | $10^{10}$ | Breakage Resulted |
| Example I | 5,000 | 141 | $10^{10}$ | No Breakage |

The disclosed mixture of the poly(amic acid-co-amideimide) copolymer and 1-methylimidazole intermediate transfer member of Example I provided improved mechanical properties over the Comparative Example 2 poly(amic acid-co-amideimide) copolymer intermediate transfer member, such as for Example 1a higher modulus, a higher break strength and no tendency to break when folded.

The materials for and the preparation of the Comparative Example 1 intermediate transfer member are about 55 percent higher in costs than the materials for and the preparation of the Example I intermediate transfer member. Also, the intermediate transfer member mixture of Example I had a 45 percent improvement in dispersion quality characteristics over the Comparative Example 1 mixture. The Example 1 higher quality dispersion will result in excellent and stable resistivity for extended time periods of at least one year.

The above prepared intermediate transfer members of the Examples may be deposited on a supporting substrate, such as a polyimide, as illustrated herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of a cured mixture of carbon black, at least one of a polysiloxane and a fluoro polymer, a poly(amic acid amideimide), a tertiary amine and a phosphate ester present in an amount of from about 0.5 to about 10 weight percent and which phosphate ester is selected from the group consisting of a tridecyl alcohol ethoxylate phosphate, a polyethylene glycol monotridecyl ether phosphate, and a nonylphenol ethoxylate phosphate, wherein said member has transferred thereto from a photoconductor a toner developed electrostatic image, and an optional polymer layer in contact with said cured mixture.

2. The intermediate transfer member in accordance with claim 1 wherein, at least one of said polysiloxane and said fluoro polymer is said polysiloxane.

3. The intermediate transfer member in accordance with claim 1 wherein said tertiary amine is an alkylimidazole, or trialkylamine.

4. The intermediate transfer member in accordance with claim 1 wherein said tertiary amine is 1-metnylimidazole, or triethylamine present in amount of from about 0.1 to about 3 weight percent.

5. The intermediate transfer member in accordance with claim 1 wherein sad phosphate ester is tridecyl alcohol etboxylate phosphate.

6. The intermediate transfer member in accordance with claim 1 wherein said phosphate ester is a polyethylene glycol monotridecyl ether phosphate.

7. The intermediate transfer member in accordance with claim 1 wherein said poly(amic acid amideimide) has a number average molecular weight of from about 2,000 to about 100,000 and a weight average molecular weight of from about 4,000 to about 200,000 as determined by Gel Permeation Chromatography analysts and present in an amount of from about 70 to about 95 weight percent, said phosphate ester being present in an amount of from about 0.5 to about 10 weight percent, said polysiloxane being present in an amount of from about 0.05 to about 1 weight percent, said carbon black being present in an amount of from about 1 to about 30 weight percent, and said tertiary amine being present in an amount of from about 0.1 to about 5 weight percent with a total of the layer mixture ingredients being about 100 percent and wherein said member has break strength of from about 135 to about 155 Mega Pascals and wherein said member has a modulus of from about 4,000 to 5,500 Mega Pascals.

8. The intermediate transfer member in accordance with claim 1 with a break strength of from about 120 to about 160 Mega Pascals.

9. The intermediate transfer member in accordance with claim 1 wherein sad poly(amic acid amideimide) is represented by the following formulas/structures wherein m and n independently represent the number of repeating segments in the polymer chain, and R is aryl

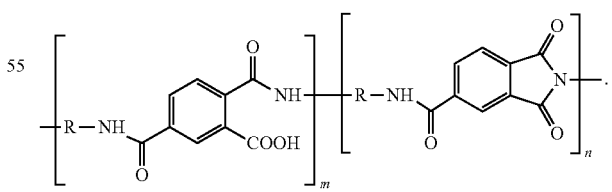

10. The intermediate transfer member in accordance with claim 9 wherein m is from about 20 to about 1,000, n is from about 20 to about 1,000, and R contains from about 6 to about 36 carbon atoms.

11. The intermediate transfer member in accordance with claim 9 wherein m is from about 325 to about 675 and n is from about 325 to about 675.

12. The intermediate transfer member in accordance with claim 9 wherein R is selected from the group consisting of at least one of the following formulas/structures, and wherein said tertiary amine is an alkylimidazole or a trailkylamine

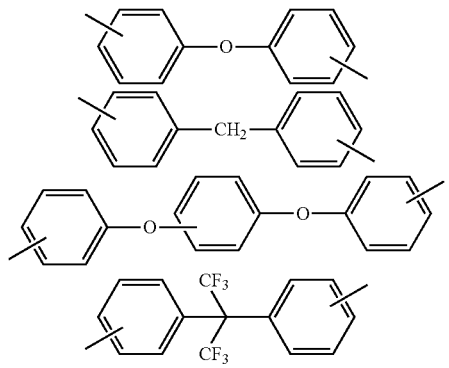

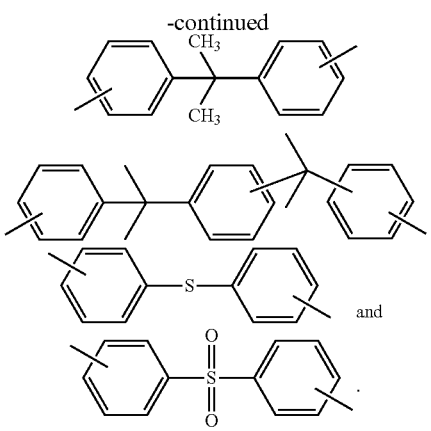

13. The intermediate transfer member accordance with claim 1 wherein said poly(amic acid amideimide) polymer is a copolymer as represented by the following formulas/structures wherein m and n independently represent the number of repeating segments where m is a number of from about 100 to about 1,000, and n is a number of from about 100 to about 1,000

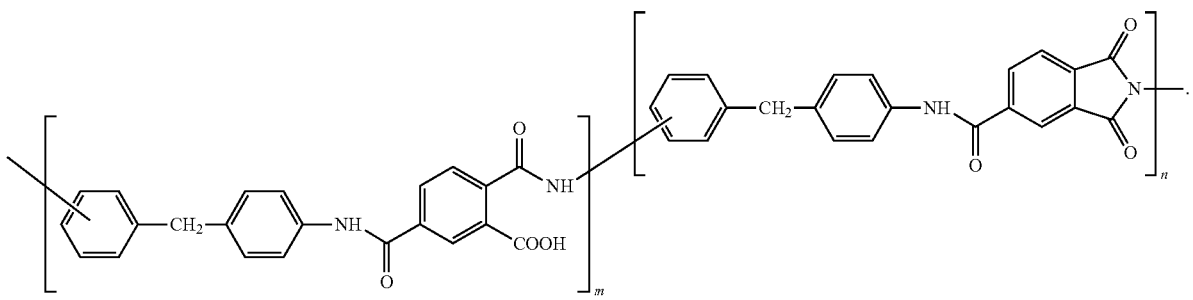

14. A seamless intermediate transfer member consisting of a supporting substrate, and a layer of a cured mixture of a poly(amic acid-co-amideimide) copolymer, a phosphate ester, a polydialkylsiloxane copolymer, a tertiary amine of 1-methylimidazole, or triethylamine and a carbon black and wherein the poly(amic acid-co-amideimide) copolymer is encompassed by the following formula/structures where m and n independently represent the number of repeating segments, where m is a number of from about 100 to about 1,000, and n is a number of from about 100 to about 1,000

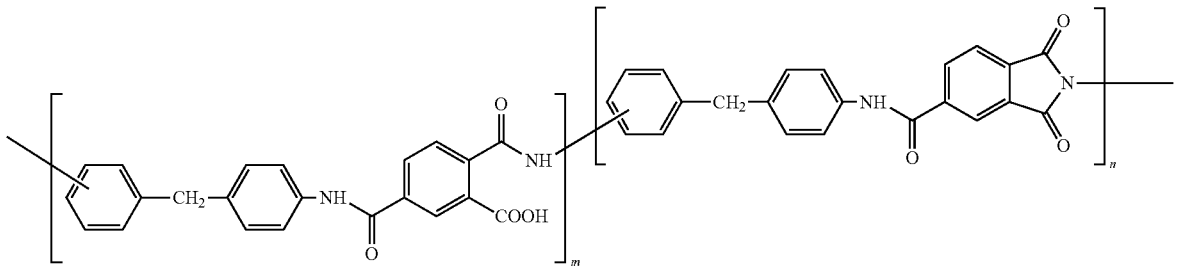

wherein said phosphate ester is selected from the group consisting of a tridecyl alcohol ethoxylate phosphate, a polyethylene glycol monotridecyl ether phosphate, and a nonylphenol ethoxylate phosphate, said poly(amic acid-co-amideimide) copolymer being present in an amount of from about 70 to about 95 weight percent, said phosphate ester being present in an amount of from about 0.5 to about 10 weight percent, said polysiloxane being present in an amount of from about 0.05 to about 1 weight percent, said carbon black being present in an amount of from about 1 to about 30 weight percent, and said tertiary amine being present in an amount of from about 0.1 to about 5 weight percent, with a total of the layer mixture ingredients being about 100 percent.

15. The seamless intermediate transfer member in accordance with claim 14 wherein m is a number of from about 275 to about 500, and n is a number of from about 275 to about 500, and said tertiary amine is 1-methylimidazole or triethylamine present in an amount of from about 0.1 to about 2 weight percent and wherein said curing is accomplished by heating said mixture at a temperature of from about 90 to about 350° C. and wherein said member has break strength of from about 135 to about 155 Mega Pascals and wherein said member has a modulus of from about 4,000 to 5,500 Mega Pascals.

16. The seamless intermediate transfer member in accordance with claim 14 wherein the poly(amic acid-co-amideimide) copolymer has a number average molecular weight of from about 10,000 to about 50,000 as determined by Gel Permeation Chromatography analysis, and a weight average molecular weight of from about 20,000 to about 100,000 as determined by Gel Permeation Chromatography analysis and wherein the curing is accomplished by heating said mixture at a temperature of from about 125 to about 275° C. followed by cooling to room temperature and drying to form a solid.

17. A seamless intermadiate transfer member consisting of a cured mixture of a poly(amic acid-co-amideimide) copolymer, a tertiary amine of an alkylimidazole, or a trialkylamine, a phosphate ester selected from the group consisting of a tridecyl alcohol ethoxylate phosphate, a polyethylene glycol monotridecyl ether phosphate, and a nonylphenol ethoxylate phosphate, a polydialkylsiloxane, and a conductive carbon black component, which member possesses a break strength of from about 130 to about 170 Mega Pascals, and wherein said member has transferred thereto from a photoconductor a toner developed electrostatic image.

18. The seamless intermediate transfer member in accordance with claim 17 where said tertiary amine is 1-methylimidazole, said break strength is from about 135 to about 155 Mega Pascals and said member has a modulus of from about 4,000 to 5,500 Mega Pascals.

* * * * *